United States Patent Office 3,594,305
Patented July 20, 1971

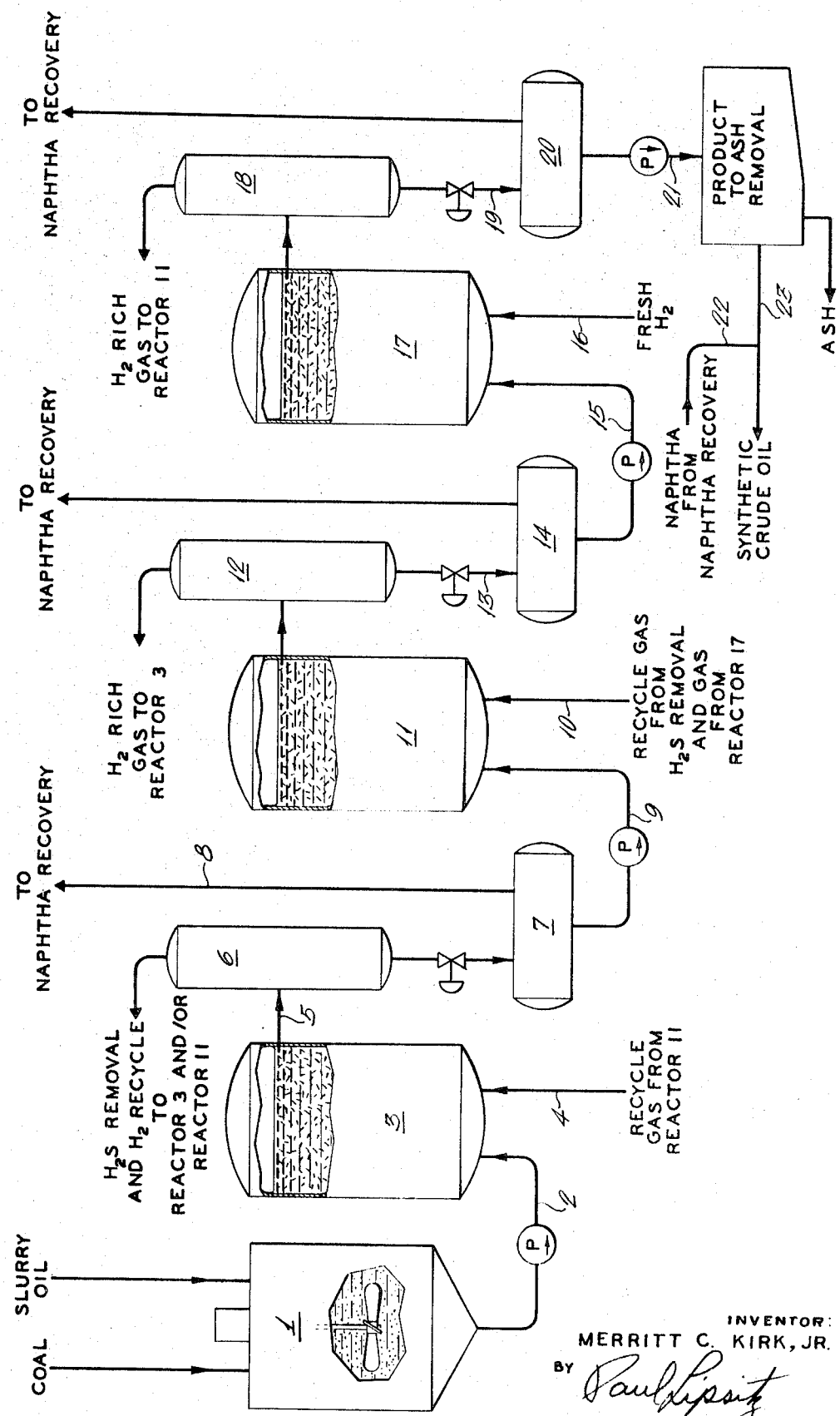

3,594,305
PROCESS FOR HYDROGENATION OF COAL
Merritt C. Kirk, Jr., Thornton, Pa., assignor to Sun Oil Company, Philadelphia, Pa.
Filed Jan. 23, 1970, Ser. No. 5,328
Int. Cl. C10g 1/04
U.S. Cl. 208—10                                        3 Claims

ABSTRACT OF THE DISCLOSURE

Process of obtaining hydrocarbons from coal by treating a hydrocarbon oil-coal slurry with hydrogen under catalytic conditions in an ebullated bed system where the reaction involves a series of reactors, each reactor increasing in temperature and pressure, oxygen and sulfur removal occurring in the first series of reactors and finally passing the oil-coal slurry through one or more final reactors which contain catalyst different from the upstream reactors to remove nitrogen compounds and complete hydrogenation, whereby an effluent is obtained suitable for hydrocarcking to fuels and other useful petroleum-like products.

---

Numerous methods have been discolsed in the art to convert coal into liquid fuels. One of these methods involves the liquefaction of coal through hydrogenation of a coal-hydrocarbon oil slurry, said hydrogenation being carried out in the presence of a catalyst and at elevated temperatures and pressures. One of the problems involved in such processes has been the difficulty in bringing the hydrogen in contact with the coal to be hydrogenated. Another problem is created by the presence of mineral matter in the coal (ash) which frequently renders inoperable a fixed-bed hydrogenation reactor due to the ash plugging the catalyst bed. These problems were alleviated somewhat by the technique of using concurrently flowing streams of the liquid and gaseous material upwardly through a vessel containing a mass of solid particles of a contact material, the mass of solid particles being maintained in random motion within the vessel by the upflowing stream and separation of the ash by floating it off with product liquid. The mass of solid particles in this state of random motion in a liquid medium has been described as "ebullated" and this technique of using an ebullated bed has been employed for coal liquefaction processes. Example 5 of Reissue Pat. No. 25,770 describes such an ebullated bed process where a coal-oil suspension is passed upwardly with hydrogen to a hydrogenator containing a mass of particulate hydrogenation catalyst. The flow of the suspension and hydrogen up through the hydrogenator effects ebullation of the catalyst particles and the hydrogenation occurs at the elevated temperatures and pressures used. Reference is also made to the article by Hellwig et al. in "Fossil Hydrocarbon and Mineral Processing," 64, 98 (1968) and "Hydrocarbon Processing," 45, 165 (1966).

While such a system is much more effective than previous coal hydrogenation systems, there are nevertheless several problems. One of these problems resides in the choice of catalyst used. It has been found that the prefererd catalyst for the ebullated bed system is a sulfided cobalt molybdenum catalyst supported on alumina, and although this catalyst is relatively cheap and insensitive to poisons, it has only moderate hydrogenation activity and is not active enough to reduce the nitrogen in the coal to satisfactorily low levels. Another problem results from the fact that the well-mixed ebullated bed approaches an isothermal condition of about 800–850° F. and this high temperature undoubtedly causes over-cracking of naphtha to less valuable gas and coke. Thus, there is a need to improve the ebullated bed system.

This invention provides a coal hydrogenation system based on the ebullated bed procedure which provides for more selective conversions, greater nitrogen removal, and provides for a more overall efficient reaction system. This is accomplished by providing, as an imporvement in the ebullated bed coal hydrogenation system, a series of ebullated bed reactors in which two or more of a first group of said reactors effect removal of sulfur and oxygen and effect some hydrogenation using as catalyst a supported sulfided Co/Mo, Ni/W or Ni/Mo catalyst, the temperature and pressure of reaction within the reactor being increased in each subsequent reactor as the product is passed downstream, hydrogen gas for each of said first group of reactors being obtained as recycle gas from the reactor next downstream; and one or more final reactors to complete hydrogenation and to effect removal of nitrogen compounds and saturate aromatic compounds, which final reactors use fresh hydrogen gas and contain a noble metal catalyst, the reactions in said final reactor being carried out at higher temperatures and pressures than in the first reactor series and being between about 750° and about 800° F. and about 3000 p.s.i.g.

In order to further describe the process of the invention, reference is now made to the figure.

Oil and finely ground coal particles are slurried in a mixer 1 and the slurry pumped through line 2 to a first ebullated bed reactor 3 which contains the particulate catalyst. Recycle hydrogen gas from the reactor next downstream is also fed through line 4 to the first reactor with the oil-coal slurry, the rate of feed of these materials being sufficient to maintain an ebullated bed. The catalyst in the first reactor will be a cobalt-molybdenum, nickel-molybdenum, nickel-tungsten, or like catalyst supported on a base such as alumina or silica and reaction condition within reactor 3 will be from about 700° to about 750° F., and about 2000 p.s.i.g. The products of reaction within this reactor are led through line 5 to a gas-liquid separator 6 where $H_2S$ and hydrogen are removed from the oil-coal slurry process stream. $H_2S$ is separated from the hydrogen which is recycled to either reactor 3, reactor 11, or both. The liquid slurry is then led to a still 7 where flash distillation of water and hydrocarbons boiling below about 400° F. (naphthas) are removed. Water is separated and removed and the naphtha is taken through line 8 to storage. The coal slurry process stream proceeds through line 9 to a second reactor 11 and recycle gas from the next downstream reactor is passed upwardly through line 10 into reactor 11 which contains an ebullated bed of the same catalyst as in first reactor 3. In this reactor, the reaction temperature and pressure are each somewhat higher than in the first reactor 3. Where, as shown in the drawing, the first series of reactors comprise two reactors, the temperature within the second reactor is on the order of 725° to 775° F. and reaction pressure will be about 2500 p.s.i.g. As before, the reaction products are separated in the gas-liquid separator 12, and the hydrogen gas recovered and recycled back to reactor 3. The oil-coal slurry then proceeds through line 13 to still 14 where naphtha and water are removed as before, and the slurry proceeds through line 15 together with fresh hydrogen being introduced at line 16 into a final stage reactor 17 which contains a noble metal catalyst supported on alumina. Where a single final stage reactor is used as shown in the drawing, reaction conditions are on the order of 750 to 800° F. and 3000 p.s.i.g. However, it will be understood that more than one final stage reactor may be used and that temperature and pressure conditions will preferably be such that they will be somewhat higher as the product stream passes through each of the downstream reactors. It is in the final stage reactors that significant hydrogenation occurs with removal of nitrogen compounds.

The products pass into the liquid-gas separator 18 where the hydrogen-rich gas is separated and returned to reactor 11 upstream. The oil-coal slurry process stream passes through line 19 into still 20 where hydrocarbons boiling below 400° F. and water are removed and the product process stream is taken to line 21 for removal of ash by filtration or other separation means. The hydrocarbon products from the naphtha recovery systems are fed through line 22 together with product from the process stream in line 23 and comprise the synthetic crude oil of the process which is a crude distillate and can be converted to gasoline by conventional refining processes.

The oil used in the initial oil-coal slurry is preferably recycle oil from the process but may be any similar type hydrocarbon oil such as anthracene oil and the like. The ratio of coal to oil is not critical, but in accord with previous practice, a weight ratio of about 1:1 to about 1:2 will be used.

The coal which will be used may be any of the wide variety of bituminous and sub-bituminous coals and lignite, but will preferably be an Illinois No. 6 type coal or Wyoming sub-bituminous type coal.

The catalysts useful in the process are well known. For the first series of reactors, the catalyst will be any one of those conventionally used in such processes and preferably a cobalt oxide-molybdenum oxide catalyst will be used. Such a catalyst system, which is often simply referred to as Co/Mo catalyst, is supported on alumina, silica or a like support and is sulfided (i.e., subjected to $H_2S$ vapors) either before or during start-up. Also of use in the first series of reactors are similar Ni/W and Ni/Mo catalysts and all of these catalysts are described and their preparation given in an article by Beuther et al. appearing in the American Chemical Society, Petroleum Division Papers, vol. 3, 1958, page 35. In the final stage reactors of the process of the invention, the catalyst used is a noble metal catalyst such as platinum, palladium, ruthenium, and the like. These catalysts are well known as conventional naphtha reforming catalysts and are made by reducing to platinum or other noble metal with hydrogen, platinum oxide or other noble metal oxide deposited on a support. The preferred catalyst is platinum on alumina. References to these catalysts are found in vol. V of the text "Catalysis" by Emmett at page 175 and following.

Both the sulfided catalyst and the noble metal catalyst will differ somewhat from the conventional catalyst, however, in that the particle size employed will be smaller than normal. Catalyst particle size for the process of this invention must be an extrudate of approximately 1/32" or a spherical particle of this diameter in order to obtain and maintain an ebullated bed. Commercially available catalysts which may be used in the invention include "Aero" HDS-2 (a Co/Mo catalyst) and HDS-3 (a Ni/Mo catalyst) both of these being sold by Cyanamid, and platinum reforming catalysts such as "Aeroform" PHF-4 (Cyanamid) and Sinclair-Baker RD-150 (Engelhard Industries).

The process of the invention is particularly valuable in producing a clean, high-value hydrogenated product by means of reaction conditions that give a very selective conversion of coal to liquid fuels. The process provides further for good temperature control thus avoiding coking problems and because of the completeness of hydrogenation also provides for a very satisfactory separation of ash from catalyst.

The invention claimed is:
1. In the process of obtaining hydrocarbons from coal which involves catalytic hydrogenation of a hydrocarbon oil-coal slurry in an ebullated bed, the improvement which comprises providing a series of ebullated bed reactors in which two or more of a first group of said reactors effect removal of sulfur and oxygen and effect some hydrogenation using as catalyst a supported sulfide Co/Mo, Ni/W, or Ni/Mo catalyst, the temperature and pressure of reaction within the reactors being increased in each subsequent reactor as the products pass downstream, hydrogen gas for each of said first group of reactors being obtained as recycle gas from the reactor next downstream; and one or more final reactors to complete hydrogenation and to effect removal of nitrogen compounds and saturate aromatic compounds, which final reactors use fresh hydrogen gas and contain a noble metal catalyst, the reactions in said final reactors being carried out at higher temperatures and pressures than in the first reactor series.

2. A multi-stage process for the production of hydrocarbons from coal employing a series of ebullating bed reactors which comprises:
(1) feeding a slurry of hydrocarbon oil and powdered coal into a first reactor through which hydrogen is flowing, said hydrogen being obtained as off-gas from the next downstream stage, said reactor containing a sulfided Co/Mo, Ni/W, or Ni/Mo catalyst supported on alumina which effects removal of sulfur and oxygen and effects some hydrogenation, said reactions being carried out in said reactor at a temperature of between about 700° and 750° F., and at a pressure of about 2000 p.s.i.g.;
(2) removing $H_2S$ and $H_2$ as off-gases from said first reactor effluent and subjecting the process stream to a distillation to remove water and hydrocarbons boiling below 400° F.;
(3) feeding the remaining process stream, comprised of hydrocarbons, ash and unreacted coal, to at least one additional reactor as described in (1) above, but operating at a higher temperature of between about 725° and about 775° F. and at a pressure of about 2500 p.s.i.g.;
(4) removing $H_2S$ and $H_2$ as off-gases, separating the $H_2$ therefrom and recycling the $H_2$ to the previous reactor, and subjecting the process stream to a distillation to remove water and hydrocarbons boiling below 400° F.;
(5) feeding the process stream to one or more final ebullated bed reactors through which fresh hydrogen is flowing and which contains a noble metal catalyst to effect removal of nitrogen compounds and to hydrogenate aromatic compounds, said reactions being carried out in said reactor at a temperature of between about 750° F. and 800° F. and at a pressure of about 3000 p.s.i.g.;
(6) removing $H_2S$ and $H_2$ as off-gases, separating the $H_2S$ therefrom and recycling the $H_2$ to an upstream reactor and subjecting the process stream to distillation to remove water and hydrocarbons boiling below 400° F.;
(7) separating ash from the final process stream.

3. The process of claim 2 wherein the catalyst in the first series of reactors is Co/Mo supported on alumina and the noble metal catalyst is platinum supported on alumina.

References Cited

UNITED STATES PATENTS

| | | | |
|---|---|---|---|
| Re. 25,770 | 4/1965 | Johanson | 208—10 |
| 3,183,180 | 5/1965 | Schuman et al. | 208—10 |
| 3,321,393 | 5/1967 | Schuman et al. | 208—10 |
| 3,519,553 | 7/1970 | Johanson et al. | 208—10 |
| 3,488,279 | 1/1970 | Schulman | 208—10 |

DELBERT E. GANTZ, Primary Examiner

V. O'KEEFE, Assistant Examiner